Figure 4:
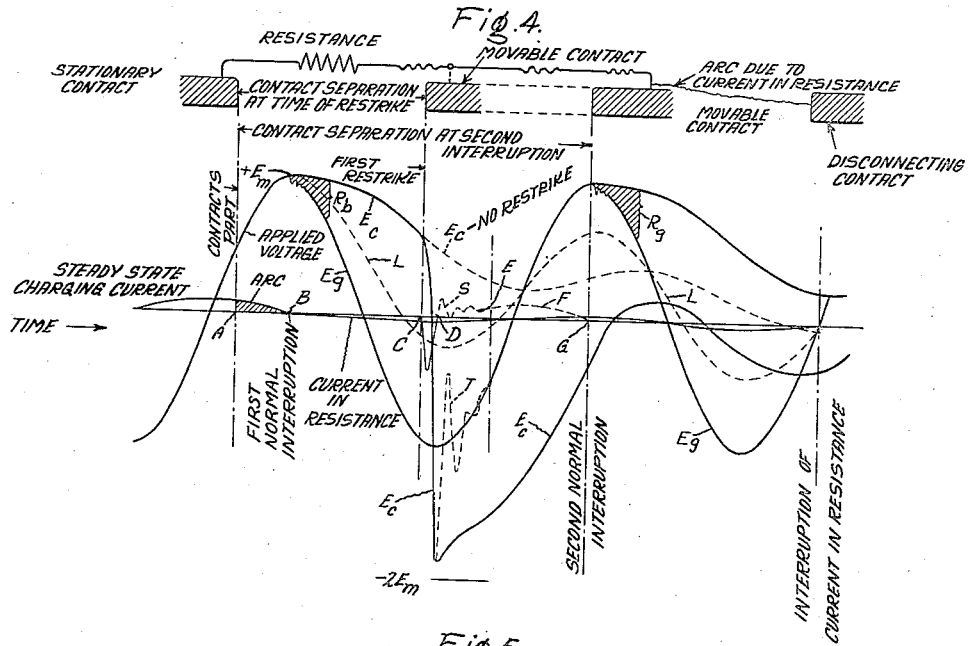

Dec. 25, 1945. E. W. BOEHNE ET AL 2,391,672
MEANS FOR ELIMINATING THE SWITCHING OVERVOLTAGE
HAZARD IN ALTERNATING CURRENT CIRCUITS
Filed Feb. 27, 1943    2 Sheets-Sheet 1
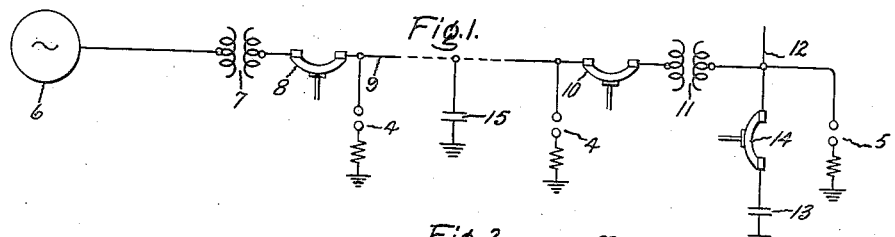
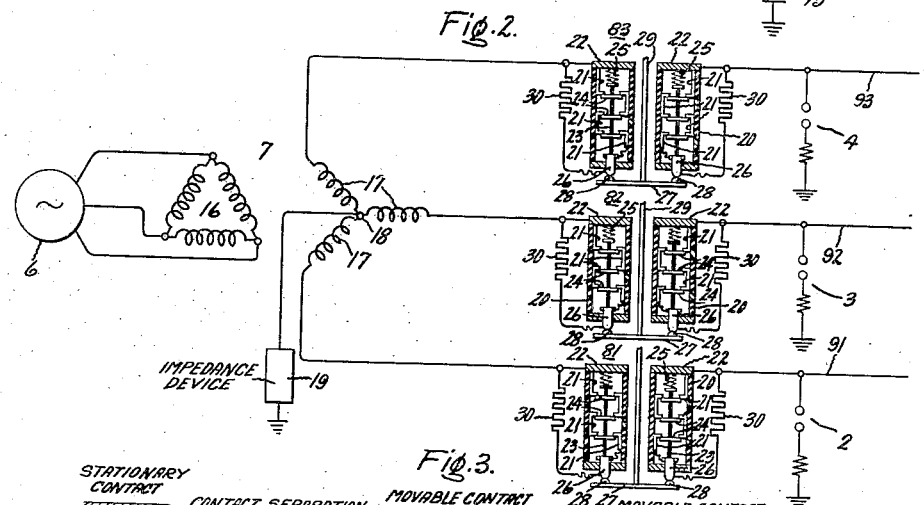
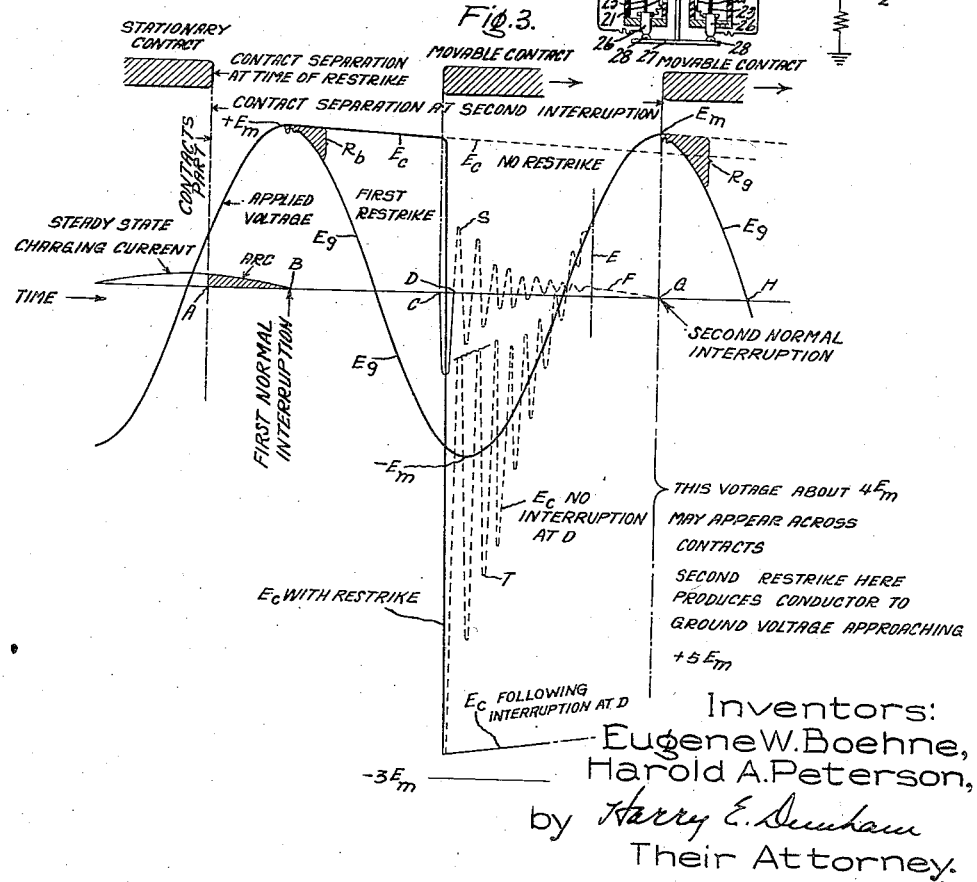
Inventors:
Eugene W. Boehne,
Harold A. Peterson,
by Harry E. Dunham
Their Attorney.

Patented Dec. 25, 1945

2,391,672

UNITED STATES PATENT OFFICE 2,391,672

MEANS FOR ELIMINATING THE SWITCHING OVERVOLTAGE HAZARD IN ALTERNATING CURRENT CIRCUITS

Eugene W. Boehne, Drexel Hill, Pa., and Harold A. Peterson, Scotia, N. Y., assignors to General Electric Company, a corporation of New York Application February 27, 1943, Serial No. 477,400

18 Claims. (Cl. 175—294)

Our invention relates to improvements in means for eliminating the switching overvoltage hazard in alternating current circuits, especially of high voltage, and more particularly in circuit breakers used to isolate a capacitive load of such capacitance and voltage that the voltage gradient across the arc interrupting contacts of the circuit breaker exceeds the dielectric strength between these contacts.

As is well known, the isolation or disconnection of a capacitance load by a circuit breaker in an alternating current system is subject to transient overvoltages, the magnitudes of which depend on the capacitance of the load, the voltage of the system, and the type of the circuit breaker. In isolating such a capacitance load, interruption at the first current zero in the arc of the leading current is readily effected at a relatively small contact separation since the load remains at approximately the crest value of the instantaneous voltage of the source for several hundred microseconds during which there is little or no voltage across the circuit breaker interrupting contacts.

But, in one-half cycle after the first current zero, the voltage of the source has reversed to its crest value, and approximately double this voltage appears across the circuit breaker contacts as a circuit recovery voltage. Whether or not restriking of the arc occurs depends on several factors, such as the type of the circuit breaker, including the speed and the magnitude of the separation of its contacts, the magnitude of the circuit recovery voltage, and the leading kva. of the load. Another factor which contributes adversely to the restriking problem is the character and degree of displacement of the neutral of the capacitive load and the neutral of the source at the time of isolation.

If the voltage gradient across the separated contacts of the circuit breaker, in consequence of this circuit recovery voltage, does not at any time exceed the dielectric strength between the contacts, there will be no disturbance since the arc will not restrike. If, however, the factors are such as to cause a restriking of the arc because the voltage gradient across the contacts exceeds the dielectric strength between them, then, since the load which is charged oppositely to the directional trend of the voltage of the source tries to follow this trend, a transient current of an oscillatory character is established.

If this natural frequency current is interrupted at the first subsequent zero, a reversed polarity transient voltage of twice normal is quickly established across the contacts, leaving the capacitive load charged at approximately three times normal voltage. The oscillation, however, may continue until it is damped out whereupon re-establishment of the system frequency charging current results. If this occurs, then interruption will again take place at the next current zero of the system frequency current which is just one cycle after the first current zero in the arc. By this time, if the gap insulation or dielectric strength between the contacts has increased sufficiently to prevent subsequent restriking, a final interruption is achieved. In this case, the circuit voltage to ground may rise to only three times normal crest voltage on a single-phase basis.

If, however, the circuit breaker effects the interruption of the high frequency current at the first current zero following a restrike, then the capacitance or circuit remains charged to as high as three times normal crest voltage. Accordingly, one-half cycle later, when the voltage of the source attains its maximum value with reversed polarity, a maximum of four times normal crest voltage appears across the circuit breaker contacts. Subsequent restriking can usually be expected under these very severe conditions. In this manner, circuit recovery voltages exceeding insulation breakdown values can be produced. Thus, for example, the circuit breaker itself is liable to distress from such excessive voltages. Moreover, since these excessive voltages may exceed the gap breakdown value of lightning arresters, these are liable to excessive operation.

An object of our invention is to provide for an alternating current circuit breaker, used to isolate a predominantly capacitive load of such capacitance as to cause the voltage gradient across the contacts of the circuit breaker to exceed the dielectric strength between the contacts, means for holding the voltage gradient within such dielectric strength or in the event of circuit reestablishment by a restrike, to maintain the circuit recovery voltages below the value corresponding to the breakdown value of other apparatus associated with the circuit and more specifically to keep the voltage to ground below a value corresponding to the gap breakdown voltage of lightning arresters associated with the circuit. Another object of our invention is economically to adapt a given circuit breaker to a particular circuit voltage recovery problem involving the isolation of capacitive loads, without rebuilding the circuit breaker to increase the speed of operation of its contacts or the dielectric strength between them.

In accordance with our invention, we provide a resistance means connected in parallel with the circuit breaker interrupting contacts and proportioned to have an ohmic value such as to keep the voltage gradient across the contacts within the dielectric strength between them during the isolation of capacitive loads and further to keep the circuit voltages to ground, in the event of circuit reestablishments, below a value corresponding to the break-down voltage of lightning arresters associated with the circuit. Also in accordance with our invention, we proportion the resistance means to have an ohmic value within a predetermined range from one to 4.4 times the ohmic value of the capacitive reactance to be isolated with a lower maximum limit when the capacitive load to be disconnected is associated with a neutral displaced from ground as by a current limiting means or otherwise. Further in accordance with our invention, the resistance means may be incorporated directly in the circuit breaker structure or included as an internal or external appendage thereof.

Our invention will be better understood from the following description when considered in connection with the accompanying two sheets of drawings, and its scope will be pointed out in the appended claims.

Figure 5:
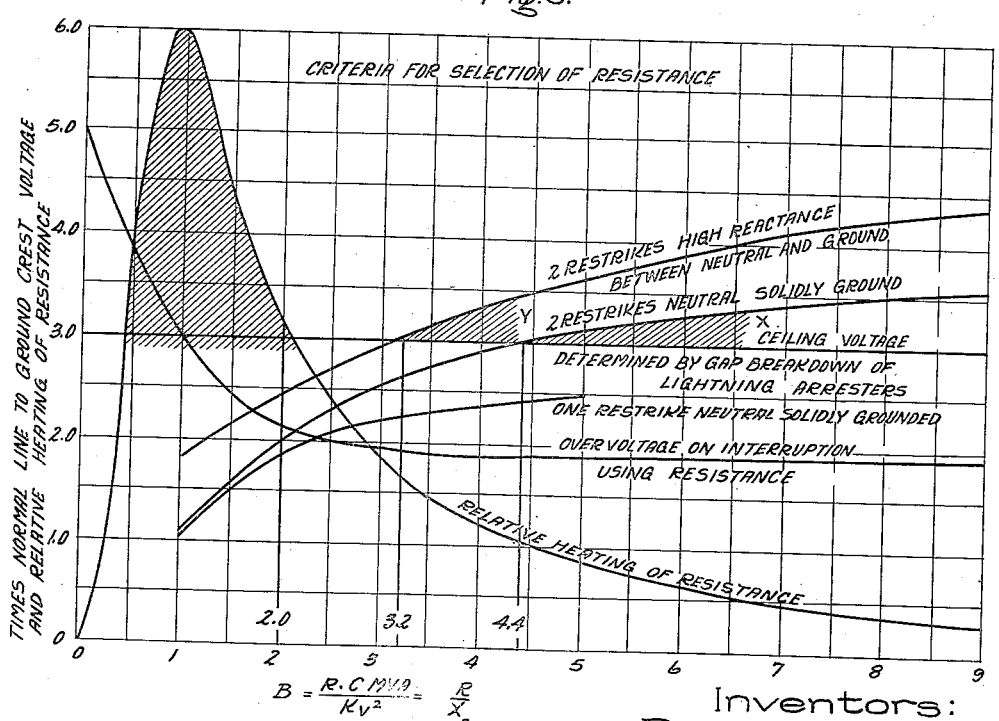

In the accompanying two sheets of drawings, Fig. 1 is a schematic circuit diagram explanatory of the application of our invention; Fig. 2 illustrates diagrammatically an embodiment of our invention; Fig. 3 is a curve diagram explanatory of the circuit voltage recovery behavior to be expected in isolating a capacitive load without the benefit of our invention; Fig. 4 is a curve diagram explanatory of the voltage behavior when isolating a capacitance load with a circuit breaker embodying our invention; and Fig. 5 is a curve diagram illustrating the criteria for selecting the circuit breaker resistance means in accordance with our invention.

In Fig. 1, we have schematically illustrated by single line diagram an alternating current system wherein may arise the switching overvoltage hazard which can be eliminated by the use of our invention. As shown, this system comprises an alternating current source 6 which is connected to the low voltage side of a step-up power transformer 7. The high voltage side of this transformer is connected through suitable circuit interrupting means, such as a circuit breaker 8, to an electric power line 9. At its remote end, the line 9 is connected through suitable circuit interrupting means, such as a circuit breaker 10, to a step-down power transformer 11, the low voltage side of which supplies a load bus 12. For power factor correction, the system may include a capacitor bank which is illustrated simply as a grounded condenser 13, although actually in a three-phase system the capacitor bank would comprise three delta-connected condensers or three star-connected condensers with their neutral ungrounded. The capacitor bank is connected to the load bus 12 by suitable circuit interrupting means 14. The power line 9, which may be single or polyphase, has, inherently, distributed capacitance, the amount depending upon the conductor size, spacing and other factors well known to the art. This capacitance is illustrated simply as a condenser 15. The electric system of Fig. 1 is protected from the dangers of lightning by the use of lightning arresters 4 and 5 so arranged as to protect, among other terminal equipment, the circuit breakers 8, 10 and 14. The arresters 4 are directly associated at all times with the capacitance 15 and are hence subjected to its voltages. The power line 9 could, of course, be either open conductor or cable.

Assuming now that the circuit breaker 10 is open and it is desired to isolate the power line 9 from the source 6 by opening the circuit breaker 8, then this circuit breaker has practically only line charging current to interrupt. Immediately there arises the problem of transient recovery voltages. The severity of the problem depends on many factors, chief of which are the leading kva. to be interrupted, the voltage of the power line 9, the type of the circuit breaker 8, and the displacement of the neutral of the star-connected windings of the transformer 7. A similar transient voltage recovery problem may arise upon opening the circuit breaker 14 while the circuit breakers 8 and 10 are closed.

However, before going into an analysis of this problem as illustrated by the wave forms of Fig. 3, reference will be had to Fig. 2 which illustrates a part of the system shown in Fig. 1 in three-phase diagram and somewhat more in detail. Thus, as shown in Fig. 2, the power transformer 7 has its low voltage windings 16 delta connected and its high voltage windings 17 star connected with its neutral point 18 indicated as grounded through an impedance device 19. For the purposes of the description of our invention, this impedance device 19 may be considered to have a range of impedance values from zero to infinity; that is to say, the neutral 18 may be directly grounded, completely isolated from ground or anything between these two extremes. The power line 9 of Fig. 1 is indicated in Fig. 2 by the phase conductors 91, 92 and 93 and is protected by lightning arresters 2, 3 and 4 respectively connected between these conductors and ground. The circuit breaker 8 is indicated by three single-pole jointly operable circuit breaker units 81, 82 and 83 respectively associated with the conductors 91, 92 and 93. As schematically illustrated, this circuit breaker is of the type disclosed in United States Letters Patent 2,164,175, issued June 27, 1939 to the assignee of this invention. A similar circuit breaker is also the subject of a paper entitled "A New Multibreak Interrupter for Fast-Clearing Oil Circuit Breakers," A. I. E. E. Transactions, vol. 57, pages 705–710. Such a circuit breaker is chosen only for the purpose of illustrating our invention, the application of which, it is to be understood, is not limited to this specific type of circuit breaker.

As illustrated in Fig. 2, each of the circuit breaker units 81, 82 and 83 comprises two multibreak interrupters adapted to tank-type oil circuit breakers and utilizing the cross-blast principle with self-contained pressure generation. Each interrupter comprises a suitably ported cylindrical housing 20 of insulating material within which are supported stationary conducting members 21 constructed and arranged to provide suitable contact gaps. The topmost conducting member 21 is conductively related to a housing cap 22. Each interrupter is supported at its upper end on an insulating bushing, not shown, through which current is conducted from the line conductors to the housing caps 22. Extending through the center of the housing 20 is an insulating rod 23 which carries the contacts 24 for bridging the contact gaps between the stationary conducting members 21. This rod is biased for movement in the circuit opening direction by gravity and resilient means indicated briefly as a spring 25. The rod 23 projects through the lower end of the housing 20 and terminates in a metal cap 26 which is conductively connected to the lowest of the conducting members 21.

Electrically intermediate relatively to the two multibreak interrupters is a disconnecting or isolating element, such as a conducting crosshead 27, which is provided with contacts 28 arranged for movement in the path of movement of the metal caps 26 on the rods 23. Upward movement of the crosshead 27 in response to the actuation of a lift rod 29 by the circuit breaker operating mechanism, not shown, moves the crosshead 27 so that the contacts 28 thereon engage the metal caps 26 and move the rods 23 into the circuit closing position where they are held by the circuit breaker mechanism in a manner well known to the art. Also, as well known to the art, the circuit breaker mechanism may be such that all the lift rods are actuated substantially simultaneously to the circuit closing position or independent pole operating mechanisms may be used if desired.

In a circuit breaker such as that described wherein the arc interruption is effected by a cross-blast action dependent on the current in the arc, the transient recovery voltage problem may become particularly severe when isolating relatively high capacitive kva. loads, especially on relatively high voltage systems, because, although the leading current may be large as such currents go, it is relatively small in comparison with the fault currents the circuit breaker is designed to interrupt. The reason for this severity of overvoltage in the case of disconnecting leading kva. loads will be more clearly understood from a careful consideration of the curves shown in Fig. 3. In this figure, only one stationary and one movable contact are shown, but the gap between these contacts is intended to depict the equivalent gap separation of all the stationary and movable contacts 21 and 24 in the two multibreak interrupters of each circuit breaker pole unit. Also, for convenience, in comparison with the different points in the curves shown, the position of the movable contact relatively to the stationary contact is represented along an axis parallel to the time axis of the diagram. It is to be understood, however, that the contact separations shown are only relative and do not represent the actual contact gap to any scale. The performance depicted in Fig. 3 is without benefit of the resistances 30, shown in Fig. 2.

In Fig. 3, the heavy solid line sinusoidal curve $E_g$, with the crest value $E_m$, represents the voltage applied to one of the phase conductors of the power line, that is, the voltage across one of the high voltage windings 17 of the power transformer 7. The half cycle of solid line sinusoidal curve at the left represents the steady state charging current flowing between the phase conductor of the power line and ground. Assuming the power line disconnected at the end remote from the power transformer 7, then when the interrupter contacts of the circuit breaker 8 at the end near the source part, as at A, an arc results from this charging current. This arc is readily interrupted, as indicated at B, at a relatively small contact separation because the voltage $E_c$ to ground of the line conductor, that is the capacitance load, remains at approximately the crest value $E_m$ of the applied voltage $E_g$ at the instant of current zero and for several hundred microseconds thereafter during which there is little or no voltage across the contacts. This relatively small voltage-across-the-contacts period is indicated by the small sectionalized area $R_b$. But, in one-half cycle after the first current zero B, the applied voltage $E_g$ has reversed to its crest value $-E_m$. The circuit recovery voltage across the circuit breaker contacts has, in consequence, tended to go to the value $2E_m$, the difference between $E_c$ and $-E_m$. If the factors are favorable to arc re-formation because the recovery voltage exceeds the dielectric strength between the contacts, then a restrike occurs at some point, such as C. At this time, the phase conductor is charged positively, that is, oppositely to the directional trend of the applied voltage. Inasmuch as the thus charged phase conductor tries to follow the directional trend of the applied voltage, a transient current S of an oscillatory character dependent on the circuit factors of inductance and capacitance is established. This relatively high frequency current is indicated by the decaying transient wave form S of which the first one-half cycle is shown in solid line and the remainder in broken line.

If this natural frequency current S is interrupted at the first subsequent current zero D, a reversed polarity transient voltage of approximately three times the crest value $E_m$ of the applied voltage $E_g$ is thereupon established on the phase conductor. On the other hand, if interruption does not take place at a natural frequency current zero, then the phase conductor is left with a voltage oscillation indicated by the broken line wave form T. These natural frequency charging currents and voltage oscillations S and T may continue until damped out, as at E, whereupon the system frequency charging current to ground of the phase conductor is re-established, as indicated by the broken line F. If this happens, normal interruption will again occur at the next current zero G of the system frequency current, which is just one cycle after the first current zero B in the arc. By this time, if conditions are favorable, the gap insulation or dielectric strength between the contacts may have increased sufficiently to prevent subsequent restriking. In other words, final interruption is usually achieved. In this case, the circuit voltage to ground will not have exceeded three times the crest value $E_m$ of the applied voltage. If, however, the circuit breaker effects the interruption of the high frequency current at the first current zero D following a restrike, then the phase conductor remains charged to as high as three times the crest value $E_m$ of the applied voltage. Consequently, one-half cycle later, when the applied voltage attains its maximum value with reversed polarity, as at the instant G, a maximum of about four times the crest value $E_m$ of the applied voltage appears across the circuit breaker contacts. If a restrike occurs at this time, then the voltage to ground $E_c$ of the phase conductor in its tendency to follow the applied voltage $E_g$ overshoots by this amount, about $4E_m$, with a resultant voltage in the reverse direction of about five times the crest value $E_m$ on the phase conductor. Under these severe conditions, subsequent restrikings of a similar nature are probable with increasing voltages at each restrike which may cause breakdown of insulation, injury to the circuit breaker itself, and excessive operation of lightning arresters.

The foregoing explanation of the severity of the overvoltage problem to be expected in consequence of circuit breaker restriking is on the basis that the capacitance to ground of the phase conductor is lumped instead of distributed as is actually the case. However, this does not materially change the analysis since the only substantial difference is that the high frequency voltage and current oscillations would be more square topped in consequence of the traveling wave property of the open line or cable.

While it is theoretically possible to increase the speed and magnitude of contact separation sufficiently to prevent these severe transient recovery voltages, this expedient is quite unsatisfactory since it would jeopardize the performance of the circuit breaker in the interruption of large fault currents. In fact, in a circuit breaker required to interrupt large inductive kva., the tendency is to part the contacts a relatively small amount and wait for current zero so as to minimize the arc length and energy to be dissipated.

We have found both by use of the transient analyzer and by power laboratory tests, both of which have been confirmed by actual power line tests and mathematically, that transient recovery voltages of a character sufficient to damage the circuit breaker, produce other insulation difficulties or cause excessive operation of lightning arresters can be prevented without interfering with the correct operation of the circuit breaker during interruption of heavy fault currents by connecting in parallel with the arcing contacts 21, 24 of the circuit breaker a resistance 30 whose ohmic value is determined in accordance with our invention. Further in accordance with our invention, although this resistance has an optimum ohmic value which is a function of the capacitance to ground of the phase conductor or capacitive load to be isolated, there is a range of ohmic values, the limits of which are a function of the positive phase sequence capacitive reactance of the phase conductor and which have as criteria for the maximum limit the possible displacement of the power line neutral 18 and for the minimum limit the heating of the resistance 30 and the magnitude of the current that the disconnecting contacts 26, 28 can break without material injury.

With the resistances 30 proportioned in accordance with our invention and connected across the arc interrupting contacts of the circuit breaker as shown in Fig. 2, the probability of restriking is reduced since the voltage $E_c$ to ground of the phase conductor is forced more closely to follow the applied voltage as will appear from a consideration of Fig. 4. Again assuming tthe power line disconnected at the end remote from the power transformer 7, then upon parting of the interrupting contacts of the circuit breaker 8 at the end near the source, as indicated at A in Fig. 4, an arc results from the interruption of the steady state charging current of the phase conductor. This arc, as before, is readily interrupted, as indicated at B at a relatively small contact separation because the voltage $E_c$ to ground of the line conductor remains at approximately the crest value $E_m$, as previously described, with a relatively small voltage-across-the-contacts period $R_b$, as before. Upon parting of the contacts, however, the steady state charging current continues to flow in the resistances 30 across the contacts, and the voltage $E_c$ of the phase conductor to ground decreases relatively fast in comparison with conditions when no resistance is present. This materially reduces the probability of restrike since one-half cycle after the first interruption at B, the voltage across the arc interrupting contacts is not double line-to-ground voltage but some value considerably less depending on the total ohmic value of the resistances 30. The voltage across the circuit breaker contacts is the difference between the voltages $E_g$ and $E_c$. This voltage, of course, stresses the dielectric between the arcing contacts, and if restriking should occur, it may happen at C, the point of maximum voltage. As before, a decaying transient current of S of an oscillatory wave form is established, and the maximum voltage to ground of the phase conductor is less than $-2E_m$ for this case.

If this natural frequency current is interrupted at the first subsequent curent zero D, a reversed polarity voltage somewhat larger than the crest value $E_m$ of the applied voltage is established momentarily from the phase conductor or the capacitive load to ground. On the other hand, if interruption does not take place at a natural frequency current zero, the phase conductor is left with a voltage oscillation indicated by the broken line wave form T. These natural frequency charging currents and voltage oscillations S and T may continue until damped out, as at E, whereupon the system frequency charging current to ground is re-established, as indicated by the broken line F. If this happens, interruption will again occur at the next current zero G of the system frequency current which is just one cycle after the first current zero B in the arc. By this time, if conditions are favorable, the gap insulation or dielectric strength between the contacts has increased sufficiently to prevent subsequent restriking and final interruption is achieved without the voltage to ground on the phase conductor exceeding more than approximately twice the crest value of the applied voltage $E_m$. The curve L in Fig. 4 shows the voltage midway between the two groups of arc interrupting contacts.

The form and disposition which the resistor 30 takes are subject to wide variation. For example, as far as our invention is concerned, the resistor may be mounted within the circuit breaker tank or externally thereto. if desired. The resistance may also be incorporated in the structure of the housing cylinder 20. That is to say, this cylinder may be made up of a suitable resistance material capable of carrying the required current. Also, the resistances 30 may be of a type wherein the resistance decreases with increase in applied voltage. One resistance material of this type is disclosed, for example, in United States Letters Patent 1,822,742, granted September 8, 1931.

It can be shown mathematically that for a single-phase grounded circuit, $$E_c = E_m \left[ \sin \theta \sin(\omega t + \theta) + \cos^2 \theta \epsilon^{\frac{-t}{RC}} \right] \quad (1)$$

Where:

$$\sin \theta = \frac{1}{\sqrt{1 + \omega RC^2}}$$

$$\cos \theta = \frac{\omega RC}{\sqrt{1 + \omega RC^2}}$$

C = Circuit capacitance in farads to ground
R = Breaker resitance per pole
$\omega = 2\pi f$—$f$ being system frequency
$E_m$ = Crest of line to neutral voltage
$E_c$ = Line to ground voltage or voltage across C Now, by incorporating a combination of circuit elements in the form, $$B = \omega RC = \left\{ \left[ \frac{R \cdot CMVA}{KV^2} \right] \right\} = \frac{R}{X_c}$$

Where:

B is an abstract or ratio number
KV is the system voltage in kilovolts $$CMVA = \frac{CKVA}{1000}$$

$X_c$ is the capacitive reactance in ohms of C at frequency $f$

The voltage to ground of the phase conductor then becomes, $$E_c = \left\{ \left[ \frac{\sin(\omega t + \theta)}{\sqrt{B^2+1}} + \frac{B^2 \epsilon^{\frac{-\omega t}{B}}}{B^2+1} \right] \right\} \quad (2)$$

The magnitude of this capacitor voltage becomes of particular importance one-half cycle following interruption, that is, $\omega t = \pi$. Making this substitution in Equation 2 and simplifying, there results, $$E_c = \left\{ \frac{B^2 \epsilon^{-\frac{\pi}{B}} - 1}{B^2+1} \right\} \text{ when } \omega t = \pi \quad (3)$$

A desirable optimum condition arises when the voltage to ground of the circuit conductor is zero at this particular instant. Thus, equating Equation 3 to zero and solving for B, there results, $$B^2 = \epsilon^{\frac{\pi}{B}}$$

from which $$B = 2.11$$

and hence, $$R = 2.11 X_c$$

or the breaker resistance is 2.11 times the phase conductor capacitive ohms to ground to achieve this desirable condition.

While the foregoing analysis has been based on a single-phase grounded circuit, the phenomena involved in a three-phase circuit are substantially similar. In the three-phase circuit, capacitances are more complicated to define, but it has been found by means of the transient analyzer and confirmed by power laboratory and field tests that the positive phase sequence capacitive reactance is the most generally acceptable capacitance quantity on which to base the proportioning of the resistance to accomplish the desired result. In other words, proportioning the resistance relatively to the positive phase sequence capacitance in accordance with the optimum value derived in the foregoing single-phase analysis, results in substantially the same insurance against overvoltages in the three-phase system as can be obtained in the single-phase system. In dealing with polyphase systems, $X_c$ is to be understood to represent the positive phase sequence capacitive reactance, a quantity well understood by those skilled in the art.

While a total ohmic value per pole of the resistances 30 of about twice the positive phase sequence capacitive reactance in ohms is the theoretical optimum, in the application of our invention it is not limited to this single specific value. On the other hand, our invention may be applied over a relatively wide range of resistance, the minimum limit of which is determined by the heating of the resistance and the amount of current the circuit breaker disconnecting contacts 26, 28 can safely break, while the upper limit is determined by the character of the neutral displacement relatively to ground and the number of times normal line-to-ground crest voltage can be exceeded without causing excessive lightning arrester operations. These limits, as based on our calculations and tests, are shown in Fig. 5 as criteria for the determination of the total value of resistance per pole. It will be observed that if lightning arresters are set for breakdown at about three times crest of normal line-to-ground voltage, then the minimum value of R is $X_c$, although from $R = X_c$ to $R = 2.11 X_c$ it is necessary to pay due regard to heating of the resistance. This is, of course, a matter of economics. If the neutral 18 is directly grounded, then R may be as high as $4.4 X_c$ without the recovery voltages exceeding three times normal crest value of line-to-ground voltage. If the neutral is grounded through a high reactance such, for example, as a ground fault neutralizer for suppressing arcing currents, then the maximum limit of R is about $3.2 X_c$. Thus, whether or not the neutral is solidly grounded, R can be chosen so as to avoid the partially shaded areas X and Y with a maximum of two restrikes and a maximum line-to-ground voltage not exceeding three times the crest value $E_m$ of the normal line-to-ground voltage $E_g$. If the resistance is constituted of a material whose resistance decreases as the applied voltage increases, for example based on the crest value of the normal line-to-ground voltage, then the resistance at this voltage may in general be much greater than the values herein set forth for fixed resistances. Thus, for example, using resistance material of the type disclosed in United States Letters Patent 1,822,742, issued September 8, 1931, the value of the resistance at the normal crest value of the applied voltage may be chosen within an ohmic range from ten to forty times the positive phase sequence capacitive reactance. In such a resistance material the ohms varies inversely as about the third power of the voltage. The higher values in the ohmic range above are to be preferred on the basis of minimizing heating, duty on disconnecting contacts, and structural space when it is desired to mount the resistance within the circuit breaker tank.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States is:

1. In a circuit breaker for interrupting alternating current power circuits which have a substantially solidly grounded neutral and wherein the circuit breaker has a plurality of contacts and is characterized by a voltage gradient across said contacts exceeding the dielectric strength between the contacts after the first interrupting current zero when isolating a predominantly capacitive load, means for holding the voltage gradient across said contacts within the dielectric strength between the contacts comprising resistance means across said contacts proportioned to have a total ohmic value from one to 4.4 times the positive phase sequence capacitive reactance of said load.

2. In combination with a circuit breaker for interrupting alternating current power circuits, said circuit breaker having a plurality of contacts and being characterized by a voltage gradient across said contacts exceeding the dielectric strength between the contacts after the first interrupting current zero when isolating a predominantly capacitive load, a resistance across said contacts proportioned relatively to the capacitance in ohms of the capacitive load to be isolated by the circuit breaker to have an ohmic value such as to tend to hold said voltage gradient within said dielectric strength and in the event that said voltage gradient exceeds the dielectric strength permitting a reestablishment of the circuit, said resistance in cooperation with the dielectric recovery characteristic of the circuit breaker acts to control the pyramiding of voltages whereby to keep the circuit voltages to ground below a value corresponding to the initiating voltage of protective apparatus associated with the circuit.

3. In combination with a circuit breaker for interrupting high voltage alternating current power circuits which have a substantially solidly grounded neutral, said circuit breaker having two sets of arc interrupting contacts and electrically intermediate disconnecting contacts and being characterized by a voltage gradient across said interrupting contacts exceeding the dielectric strength between the contacts after the first interrupting current zero when isolating a predominantly capacitive high voltage alternating current power circuit, means for holding the voltage gradient across said interrupting contacts within the dielectric strength between the contacts or in the event of circuit breaker restriking so to control the drainage of voltage from the capacitive load as to prevent the building up across said interrupting contacts of still higher voltages which tend to cause further restriking comprising resistances respectively across said two sets of arc interrupting contacts proportioned to have a total ohmic value from one to 4.4 times the positive phase sequence capacitive reactance of the associated circuit.

4. Means for controlling the connection of a source of alternating electromotive force to a relatively high capacitance power circuit having a substantially solidly grounded neutral comprising a circuit breaker having contacts adapted to be connected in series relation between the source and the circuit, and means for preventing the circuit recovery voltage from exceeding the dielectric strength between said contacts upon opening of the circuit breaker under a predominantly capacitive load condition of the circuit comprising a resistance across said contacts having an ohmic value within a range of one to 4.4 times the ohmic value of the positive phase sequence capacitive reactance of the circuit.

5. Means for controlling the connection of a source of alternating electromotive force to a relatively high capacitance power circuit comprising a circuit breaker having interrupting and disconnecting contacts adapted to be connected in series relation between the source and the circuit, said contacts opening sequentially in the order named, and means for preventing the circuit recovery voltage from exceeding the insulation breakdown value at the interrupting contacts upon opening of the circuit breaker under a predominantly capacitive load condition of the circuit comprising a resistance across said circuit breaker interrupting contacts having an ohmic value within a range of one to 3.2 times the ohmic value of the positive phase sequence capacitive reactance of the circuit.

6. In a circuit breaker for interrupting high voltage alternating current power circuits, said circuit breaker having two sets of multibreak arc interrupting contacts and electrically intermediate disconnecting contacts and being characterized by a voltage gradient across said interrupting contacts exceeding the dielectric strength between the contacts after the first interrupting current zero when isolating a predominantly capacitive high voltage alternating current power circuit, means tending to hold the voltage gradient across each of said sets of multibreak interrupting contacts within the dielectric strength between them operative to limit the over-voltages in the event of circuit breaker restriking to a predetermined value comprising resistances respectively across each of said sets of multibreak contacts, each of said resistances being proportioned to have an ohmic value from 0.5 to 1.6 times the positive phase sequence capacitive reactance of the circuit in which the circuit breaker is to function.

7. In a circuit breaker for interrupting alternating current power circuits which have a solidly grounded neutral and wherein the circuit breaker has a plurality of contacts and is characterized by a voltage gradient across said contacts exceeding the dielectric strength between the contacts after the first interrupting current zero when isolating a predominantly capacitive alternating current power circuit, means tending to hold the voltage gradient across said contacts within the dielectric strength between the contacts operative to limit the overvoltages in the event of circuit breaker restriking to a predetermined value comprising resistances respectively across said contacts proportioned to have a total ohmic value from one to 4.4 times the positive phase sequence capacitive reactance of the associated circuit.

8. Means for connecting a source of alternating electromotive force to a relatively high capacitance power circuit comprising a circuit breaker having contacts adapted to be connected in series relation between the source and the circuit, and means tending to prevent the circuit recovery voltage from exceeding the dielectric strength between said contacts upon opening of the circuit breaker under a predominantly capacitive load condition of the circuit operative to hold the voltage gradient across said contacts within the interrupting capacity of the circuit breaker comprising a resistance across said circuit breaker contacts having an ohmic value approximately equal to twice the ohmic value of the positive phase sequence capacitive reactance of the circuit.

9. In a circuit breaker for interrupting alternating current power circuits, said circuit breaker having a plurality of contacts and being characterized by a voltage gradient across said contacts exceeding the dielectric strength between the contacts after the first interrupting current zero when isolating a predominantly capacitive alternating current power circuit, a resistance of the type whose ohmic value decreases as the applied voltage increases across said contacts proportioned relatively to the capacitance of the circuit with which the circuit breaker is associated to have at the crest value of the normal line-to-ground voltage of the circuit an ohmic value within a range from ten to forty times the positive phase sequence capacitive reactance of the associated circuit.

10. In a circuit breaker for interrupting alternating current power circuits, said circuit breaker having a plurality of contacts and being characterized by a voltage gradient across said contacts exceeding the dielectric strength between the contacts after the first interrupting current zero when isolating a predominantly capacitive alternating current power circuit, a resistance across said contacts proportioned relatively to the capacitance of the circuit with which the circuit breaker is associated to have an ohmic value such as to keep said voltage gradient within said dielectric strength and to keep the circuit voltages to ground below a value corresponding to the gap breakdown voltage of lightning arresters associated with the circuit.

11. In a circuit breaker for interrupting alternating current power circuits, said circuit breaker having a plurality of contacts and being characterized by a voltage gradient across said contacts exceeding the dielectric strength between the contacts after the first interrupting current zero when isolating a predominantly capacitive alternating current power circuit, a resistance of the type whose ohmic value varies inversely as a predetermined power of the applied voltage across said contacts proportioned relatively to the capacitance of the circuit with which the circuit breaker is associated to have at the crest value of the normal line-to-ground voltage of the circuit an ohmic value not exceeding forty times the positive phase sequence capacitive reactance of the associated circuit.

12. Means for controlling alternating current power circuits comprising a circuit breaker having a plurality of contacts and characterized by a voltage gradient across said contacts exceeding the dielectric strength between the contacts after the first interrupting current zero when isolating a predominantly capacitive alternating current power circuit and a resistance of the type whose ohmic value is inversely proportional to about $E^{2.6}$, E being the applied voltage, across said contacts proportioned relatively to the capacitance of the circuit with which the circuit breaker is associated to have at the crest value of the normal line-to-ground voltage of the circuit an ohmic value not exceeding forty times the positive phase sequence capacitive reactance of the associated circuit.

13. Means for controlling alternating current power circuits comprising a circuit breaker having a plurality of contacts and characterized by a voltage gradient across said contacts exceeding the dielectric strength between the contacts after the first interrupting current zero when isolating a predominantly capacitive load and a resistance across said contacts, proportioned relatively to the capacitance in ohms of the capacitive load to be isolated by the circuit breaker to have an ohmic value such as to keep said voltage gradient within said dielectric strength or in the event that said voltage exceeds the dielectric strength permitting a re-establishment of the circuit, said resistance in cooperation with the dielectric recovery characteristic of the circuit breaker acting to control the pyramiding of voltages whereby to prevent the circuit voltages to ground from exceeding three times the crest value of the normal circuit voltage to ground.

14. In a circuit breaker for interrupting alternating current power circuits, said circuit breaker having a plurality of contacts and being characterized by a voltage gradient across said contacts exceeding the dielectric strength between the contacts after the first interrupting current zero when isolating a predominantly capacitive load, a resistance across said contacts proportioned, relatively to the capacitance in ohms of the capacitive load to be isolated by the circuit breaker, to have an ohmic value such as to hold said voltage gradient within said dielectric strength.

15. In a circuit breaker for interrupting alternating current power circuits, said circuit breaker having a plurality of contacts and being characterized by a voltage gradient across said contacts exceeding the dielectric strength between the contacts after the first interrupting current zero when isolating a predominantly capacitive load, a resistance across said contacts proportioned relatively to the capacitance in ohms of the capacitive load to be isolated by the circuit breaker to have an ohmic value such that said resistance in cooperation with the dielectric recovery characteristic of the circuit breaker acts to control the pyramiding of voltages whereby to keep the circuit voltages to ground below a value corresponding to the initiating voltage of protective apparatus associated with the circuit.

16. In a circuit breaker for the interruption of the predominantly capacitive current associated with an energized alternating current circuit whose distributed constants of capacitance and inductance could effect propagation and reflection of voltage waves following a plurality of quickly successive isolations of the circuit during the opening operation of the circuit breaker wherein the amplitude of said voltage waves would build up the voltage across the circuit breaker contacts to a value of the order of about four or more times the crest value of the normal voltage to ground of the circuit, means associated with said circuit breaker for introducing an impedance in said circuit, said impedance being of a value to limit the voltage across the contacts of said circuit breaker to between one and two times the crest value of the normal voltage to ground of the circuit whereby to limit the circuit voltage to ground to between one and one-half and three times the normal crest voltage to ground of the circuit.

17. In a circuit breaker for the interruption of the predominantly capacitive currents associated with an alternating current circuit whose capacitance is of such a value as to cause the circuit breaker to restrike following a momentary interruption wherein high frequency oscillations of voltage and current consequent upon this restriking action are of such a character as to permit the circuit breaker to interrupt said high frequency current with additional restriking following such momentary isolation and tending to give rise to voltages to ground of the order of three to five times the crest value of the normal voltage to ground or more, means for introducing into the circuit by the action of the circuit breaker an impedance of such value as to reduce both the number of restrikes of the circuit breaker and the effects of such restrikes whereby to limit the voltage to ground of the circuit to a value below three times the crest value of the normal voltage to ground of the circuit.

18. In a circuit breaker for the interruption of the predominantly capacitive currents associated with a bank of capacitors whose capacitance is of such a value as to cause the circuit breaker to restrike following a momentary interruption wherein the high frequency oscillations of voltage and current consequent upon this action are of such a nature as to permit the circuit breaker to interrupt said high frequency current with additional restriking following such momentary isolation and tending to give rise to voltages to ground of the order of three to five times the crest value of the normal voltage to ground or more, means for introducing into the circuit by the action of the circuit breaker an impedance of such value as to reduce both the number of restrikes of the circuit breaker and the effects of such restrikes whereby to limit the voltage to ground to a value below three times the crest value of the normal voltage to ground.

EUGENE W. BOEHNE.
HAROLD A. PETERSON.

Certificate of Correction

Patent No. 2,391,672. December 25, 1945.

EUGENE W. BOEHNE ET AL.

It is hereby certified that errors appear in the printed specification of the above numbered patent requiring correction as follows: Page 4, second column, line 18, for "curent" read *current*; line 71, for "resitance" read *resistance*; page 5, first column, line 28, for that portion of the equation reading $$-\frac{\pi}{\mathrm{B}} \text{ read } -\frac{\pi}{B}$$

and that the said Letters Patent should be read with these corrections therein that the same may conform to the record of the case in the Patent Office.

Signed and sealed this 2d day of July, A. D. 1946.

[SEAL]

LESLIE FRAZER,
*First Assistant Commissioner of Patents.*